(12) United States Patent
Nouri

(10) Patent No.: US 12,087,030 B2
(45) Date of Patent: Sep. 10, 2024

(54) SALIENCY-BASED DIGITAL ENVIRONMENT ADAPTATION

(71) Applicant: Microsoft Technology Licensing, LLC, Redmond, WA (US)

(72) Inventor: Elnaz Nouri, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 17/710,652

(22) Filed: Mar. 31, 2022

(65) Prior Publication Data

US 2023/0316703 A1    Oct. 5, 2023

(51) Int. Cl.
*G06V 10/46*    (2022.01)
*G06T 19/00*    (2011.01)
*G06V 10/20*    (2022.01)

(52) U.S. Cl.
CPC .......... *G06V 10/462* (2022.01); *G06T 19/006* (2013.01); *G06V 10/255* (2022.01)

(58) Field of Classification Search
None
See application file for complete search history.

(56) References Cited

U.S. PATENT DOCUMENTS

| 2020/0250858 | A1  | 8/2020  | Li et al. |
| 2020/0312298 | A1* | 10/2020 | Bui ........................ G06F 3/167 |
| 2021/0390745 | A1  | 12/2021 | Rykhliuk et al. |
| 2023/0259202 | A1* | 8/2023  | Doken ................... G06T 19/20 345/633 |

OTHER PUBLICATIONS

"International Search Report and Written Opinion issued in PCT Application No. PCT/US2023/013174", Mailed Date: May 15, 2023, 10 Pages.

* cited by examiner

*Primary Examiner* — Nurun Flora

(57) ABSTRACT

In examples, a saliency metric may be determined for an instance of content and/or a location of a digital environment. Accordingly, a set of candidate content and/or locations may be ranked according to associated saliency metrics, such that content and/or an associated location with which to adapt the digital environment for a given user may be determined from a set of candidates. For example, the digital environment may be adapted to present a two-dimensional or a three-dimensional asset to a user. As another example, a game mechanic of the digital environment may be altered. In examples, content from another digital environment may be identified and used to adapt the digital environment, thereby incorporating external content. Thus, a saliency metric associated with a location or an instance of content may be used to programmatically generate a relative or absolute metric with which to evaluate and adapt aspects of the digital environment.

20 Claims, 8 Drawing Sheets

SALIENCY-BASED DIGITAL ENVIRONMENT ADAPTATION

BACKGROUND

A user may be presented with and/or interact with content of a digital environment. However, different users may find different content more engaging. Thus, adapting the digital environment to account for user-specific differences and improve the associated user experience may be difficult.

It is with respect to these and other general considerations that embodiments have been described. Also, although relatively specific problems have been discussed, it should be understood that the embodiments should not be limited to solving the specific problems identified in the background.

SUMMARY

In examples, a saliency metric may be determined for an instance of content and/or a location of a digital environment. Accordingly, a set of candidate content and/or locations may be ranked according to associated saliency metrics, such that content and/or an associated location with which to adapt the digital environment for a given user may be determined from a set of candidates. For example, the digital environment may be adapted to present a two-dimensional or a three-dimensional asset to a user. As another example, a game mechanic of the digital environment may be altered. In examples, content from another digital environment may be identified and used to adapt the digital environment, thereby incorporating external content. Thus, a saliency metric associated with a location or an instance of content may be used to programmatically generate a relative or absolute metric with which to evaluate and adapt aspects of the digital environment.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
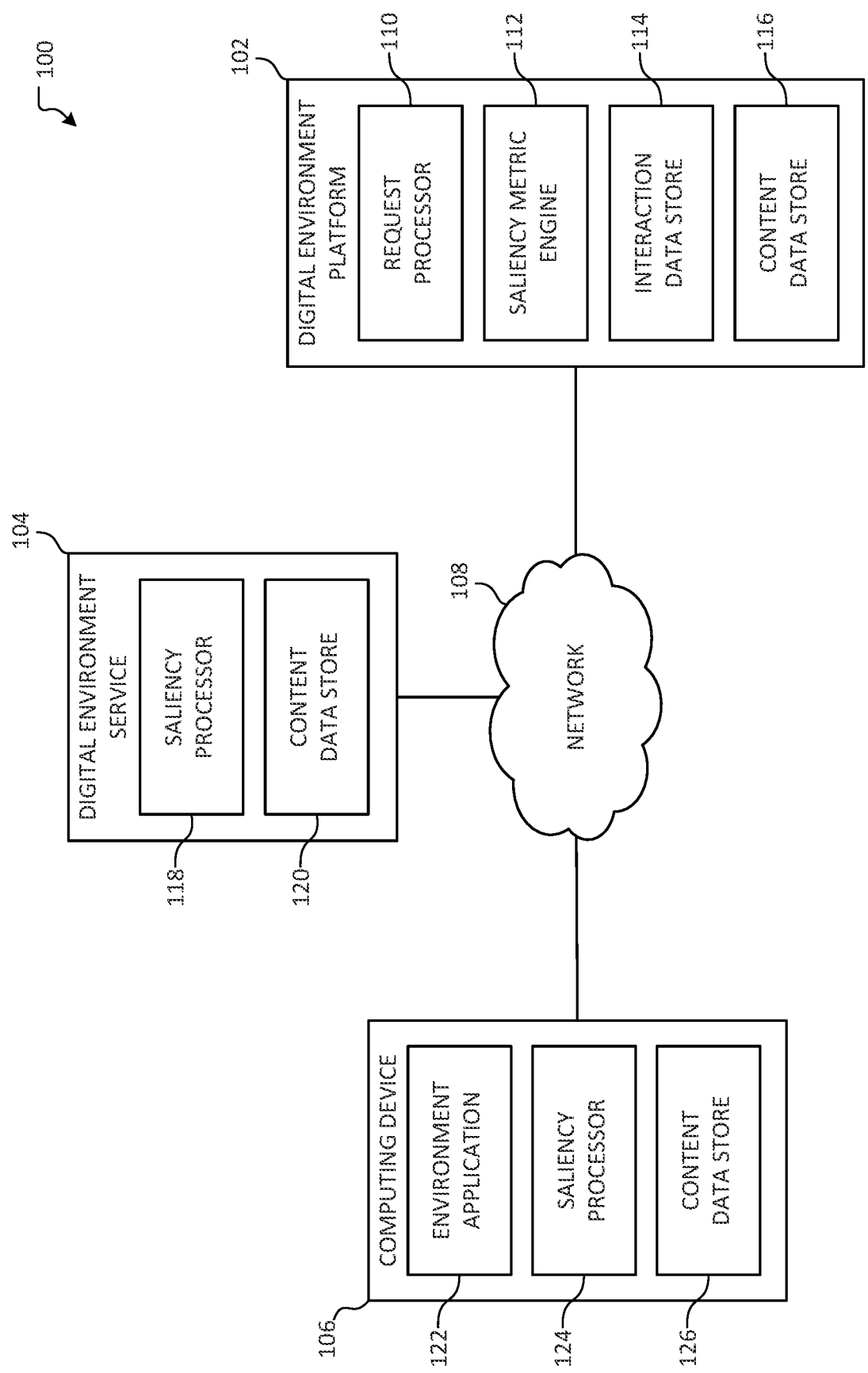
FIG. 1 illustrates an overview of an example system for saliency-based digital environment adaptation according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, content of a digital environment may be presented to a user. Example digital environments include, but are not limited to, a video game environment, a virtual collaboration environment, an alternate reality (AR) environment, and/or a virtual reality (VR) environment. For example, the digital environment may be part of a metaverse. Content of the digital environment may include environmental assets (e.g., sounds, textual overlays, two-dimensional (2D) or three-dimensional (3D) models or game items, scenery, weapons, non-player characters (NPCs), and player models) and environmental mechanics (e.g., relating to the behavior of a given asset, a minigame, and/or set of choices for a role-playing game). As another example, a non-fungible token may be or may otherwise be associated with an instance of content. However, creating an individualized experience within for a user within a digital environment (e.g., based on a user profile and associated implicit or explicit preferences) may be difficult. Additionally, adapting a digital environment based on content associated with another digital environment (e.g., to provide recommendations across different digital environments) may be similarly difficult, for example as a result of little or no insight into user preferences across multiple digital environments.

Accordingly, aspects of the present disclosure relate to saliency-based digital environment adaptation. In examples, a digital environment may be adapted based on any of a variety of factors, including, but not limited to, content attributes (e.g., relating to desirability and/or scarcity of the content), environment attributes (e.g., relating to a spatial location within the digital environment at which the content may be presented), user profile attributes (e.g., relating to a user's play style, a number of user interactions with content and/or content of a similar type, attention habits, for example based on a user's viewshed determined from an AR/VR headset, and/or explicit and/or implicit user-specific preferences), and/or population attributes (e.g., similar to user profile attributes for a larger population of users). Accordingly, a saliency metric may be determined for content and/or locations of a digital environment based on such factors. While example factors are described herein, it will be appreciated that any of a variety of additional and/or alternative factors may be used in other examples.

As an example, content from a set of content may be determined based on associated saliency metrics, where the set of content is ranked according to a saliency metric for each instance of content. Accordingly, the highest-ranked saliency metric may be determined for presentation to a user. For example, a 2D or 3D asset may be presented to the user and/or an environmental mechanic may be incorporated or modified (e.g., to present a user with a different set of story options and/or to have a different level of difficulty, prominence, and/or length). As another example, a similar technique may be used to determine a spatial location (e.g., within the digital environment, which may be overlaid on a physical environment of the user) at which to present content to the user, such that a set of spatial locations may be ranked according to associated saliency metrics. Thus, the experience provided by a digital environment may vary between users, thereby offering an individualized experience to each user.

While example adaptations are described, it will be appreciated that any of a variety of additional or alternative adaptations may be performed in other examples. For example, a representation of the digital environment may be adapted according to saliency metrics, such that content having a higher saliency metric is rendered at a higher quality level (e.g., using more detailed textures, more detailed 3D models, and/or a video encoding higher bitrate), while content having a lower saliency metric is rendered at a lower quality level. As another example, content of the digital environment having a saliency metric above a predetermined threshold may be cached in system memory, while content having a saliency metric below a predetermined threshold may be loaded into system memory once it is needed to render the digital environment.

As another example, it may be determined based on a saliency metric that an NPC should be spawned within a digital environment, as may be the case when associated environmental and/or population factors indicate a location having increased difficulty. As a result, the NPC may assist the user, thereby reducing the potential for user frustration. Similarly, a recommendation may be presented to request assistance from another user of the digital environment and, in response to acceptance of the recommendation, another user may be identified and communication between the users may be established, thereby enabling users to help one another. By contrast, if a user factor indicates an increased aptitude for a game mechanic associated with the location, the NPC may have a comparatively reduced saliency metric, such that the NPC may not be spawned or an NPC having reduced utility may be spawned in such an example.

Further, while a saliency metric in the context of adapting a digital environment, it will be appreciated that additional or alternative uses may exist. As noted above, associated saliency metrics may be used to compare a first content item to a second content item, thereby establishing a relative "value" of the first and second content items. In other examples, such a value need not be relative, and may instead be an estimated or predicted value, as may be the case when content has not yet been introduced to a digital environment. Thus, a saliency metric may be indicative of relevance, desirability, estimated interest, and/or perceived value of a given instance of content and/or location according to aspects described herein. As another example, a saliency metric may be used to assign a value associated with a spatial location of a digital environment, such that corresponding content may be identified according to the assigned value of the spatial location.

It will be appreciated that content used to adapt a digital environment need not be limited to content initially associated with the digital environment. For example, content associated with a different digital environment may be determined according to aspects described herein and presented within the digital environment accordingly. For example, such external content may be a game item from a different game or may include targeted content provided by a third party, among other examples. Thus, as compared to instances where a digital environment itself is presented as a recommendation (e.g., a list of games that similar players also enjoyed), content from within a different digital environment itself may be presented to a user (e.g., if you liked this mechanic or item, try a similar mechanic or item from a different digital environment).

Additionally, similar techniques may be used for adapting a feed, recording, stream, or other reproduction of the digital environment (e.g., in addition to the initial rendering presented to the user). For example, the digital environment may be adapted according to aspects described herein when rendered for the user, and a stream of the render (e.g., as may be provided to another computing device via a streaming platform) may be further adapted with similar or different content. For example, the stream of the digital environment may be adapted to include external content (e.g., based on environmental factors associated with the stream, such as a portion of a story associated with the stream). In examples, the digital environment may be adapted based at least in part on a set of attributes associated with the first user (e.g., for which the digital environment is rendered), while a stream of the digital environment may be adapted based at least in part on a set of attributes associated with a second user or a group of users (e.g., to which the stream of the digital environment is provided).

As noted above, a digital environment may be adapted based on any of a variety of factors, including, but not limited to, content attributes, environment attributes, user profile attributes, and/or population attributes. In examples, data associated with such factors may be maintained local to a user's device (e.g., an application associated with a digital environment may maintain user profile data local to the computing device) and/or may be aggregated by a digital environment platform. For example, the digital environment platform may aggregate telemetry data associated with one or more digital environments, such that the telemetry data may be used to determine attributes associated with a user and/or one or more user populations (e.g., associated with a geographic region, locale, or any of a variety of other demographics for one or more digital environments).

A saliency metric for content may be generated based on such factors using any of a variety of techniques, including, but not limited to, a statistical model (e.g., where factors are combined according to a set of weights) or a machine learning model. For example, a machine learning model may be trained based on user interactions with content of a digital environment (e.g., as may be determined based on telemetry data) that is annotated according to associated factors. In some instances, a machine learning model may be tuned for a specific user or may otherwise be user-specific or population-specific, among other examples. As an example, the machine learning model may be trained to determine content or locations from a set of candidates to maximize the likelihood of user engagement with the determined content or location. Such techniques may be used to generate a relative saliency metric (e.g., for comparing a first content item to a second content item) or an absolute saliency metric, among other examples. In examples, the saliency metric may comprise a targeted content value or rating.

FIG. 1 illustrates an overview of an example system 100 for saliency-based digital environment adaptation according to aspects described herein. As illustrated, system 100 comprises digital environment platform 102, digital environment service 104, computing device 106, and network 108. In examples, digital environment platform 102, digital environment service 104, and/or computing device 106 communicate via network 108, which may comprise a local area network, a wireless network, or the Internet, or any combination thereof, among other examples.

Digital environment platform 102 may aggregate telemetry data associated with one or more digital environments (e.g., as may be associated with digital environment service 104). While digital environment platform 102 and digital environment service 104 are illustrated separately in FIG. 1, it will be appreciated that, in other examples, a digital environment service may implement aspects similar to those of digital environment platform 102. Thus, aspects of the present disclosure may be similarly applied in the context of a single digital environment (e.g., as may be provided by a digital environment service similar to digital environment service 104) or multiple digital environments. For example, while digital environment platform 102 is illustrated as including saliency metric engine 112 and interaction data store 114, digital environment service 104 may additionally or alternatively include aspects, as may be the case when digital environment service 104 generates a saliency metric independently from or in addition to digital environment platform 102. Similarly, digital environment platform 102 may incorporate aspects similar to digital environment service 104, such that digital environment platform 102 provides a digital environment platform in addition to performing telemetry data aggregation and data processing to generate saliency metrics as described herein.

Digital environment platform 102 is illustrated as including request processor 110, saliency metric engine 112, interaction data store 114, and content data store 116. In examples, request processor 110 processes various requests, as may be received from digital environment service 104 and computing device 106. For example, request processor 110 may process a request for a saliency metric associated with content (e.g., as may be received from saliency processor 118 or 124 of digital environment service 104 and computing device 106, respectively). In examples, the request may comprise an indication of content for which the saliency metric, an indication of an associated digital environment, and/or one or more demographics. As another example, the request may include at least a part of a user profile, which may be used to generate the saliency metric accordingly. As another example, the request may be for content and/or a ranked set of content for use when adapting a digital environment.

Saliency metric engine 112 may generate a saliency metric and/or an indication of a location and/or content, which may be provided in response to such a request. For example, saliency metric engine 112 may process telemetry data stored in interaction data store 114 and/or content attributes associated with candidate content (e.g., as may be received by request processor 110, obtained from content data store 120 of digital environment service 104, obtained from content data store 126 of computing device 106, and/or accessed from content data store 116, among other examples). As discussed above, saliency metric engine 112 may use any of a variety of techniques to generate saliency metrics and/or determine content and/or locations from a set of candidates based on associated factors according to aspects described herein. Additional examples of such aspects are discussed below with respect to method 200 of FIG. 2.

As another example, request processor 110 may aggregate telemetry data (e.g., from digital environment service 104 and/or computing device 106), which may be stored in interaction data store 114. In some instances, content data store 116 stores content associated with one or more digital environments and/or content that may not be associated with a digital environment, thereby enabling a digital environment to be adapted according to external content (e.g., as compared to content associated with a given digital environment, as may be stored by content data store 120 of digital environment service 104).

System 100 is further illustrated as including digital environment service 104, which may be used to provide a digital environment. For example, environment application 122 and digital environment service 104 may operate as a client and a server, respectively, when rendering a digital environment for display to a user of computing device 106. In other examples, environment application 122 may operate locally (e.g., to generate an offline digital environment), such that digital environment service 104 may distribute environment application 122 to any of a variety of computing devices. As another example, digital environment service 104 may render at least a part of the digital environment, which may be provided to environment application 122 of computing device 106 for display accordingly. While system 100 is illustrated as including a single computing device 106 having associated environment application 122, it will be appreciated that any number of computing devices and associated environment applications may be used in other examples.

Digital environment service 104 is illustrated as comprising saliency processor 118 and content data store 120. In examples, saliency processor 118 generates telemetry data and/or obtains telemetry data (e.g., from computing device 106), at least some of which may be provided for aggregation by digital environment platform 102. Additionally, saliency processor 118 may request a saliency metric from digital environment platform (e.g., as may be processed by request processor 110 as described above). For example, saliency processor 118 may request a saliency metric for content of content data store 120 (e.g., as may be associated with the digital environment) and/or may request external content from digital environment platform 102 (e.g., as may be stored by content data store 116).

While saliency metric generation is described above with respect to saliency metric engine 112, it will be appreciated that, in other examples, digital environment service 104 may obtain a machine learning model and/or a weighted function from digital environment platform 102 with which a saliency metric may be generated, such that at least some saliency metrics may be generated at digital environment service 104.

Computing device 106 may be any of a variety of computing devices, including, but not limited to, a mobile computing device, a tablet computing device, a laptop computing device, or a desktop computing device. In examples, computing device 106 is or otherwise may be communicatively coupled to an AR and/or VR headset, among other examples. As illustrated, computing device 106 includes environment application 122, saliency processor 124, and content data store 126. Aspects of saliency processor 124 and content data store 126 may be similar to saliency processor 118 and content data store 120, respectively, of digital environment service 104 and are therefore not necessarily redescribed below in detail.

As noted above, environment application 122 may generate a digital environment for presentation to a user of computing device 106. As another example, at least a part of the digital environment may be rendered by digital environment service 104. Accordingly, saliency processor 124 and/or saliency processor 118 may determine content with which to adapt the digital environment according to aspects described herein. For example, saliency processor 124 may request a saliency metric and/or content from digital environment platform 102. In examples, the request includes at least a part of a user profile, as may be stored by computing device 106. In other examples, such information may be stored by digital environment service 104 and/or digital environment platform 102. Thus, environment application 122 may determine a spatial location at which to present content, may determine content to present to the user from a set of content, and/or may adapt an environmental mechanic according to determined content, among other examples.

Additionally, or alternatively, in examples where the digital environment is streamed, recorded, or otherwise captured the representation of the digital environment may be adapted according to determined content, for example to include such content. In some examples, content determined by saliency processor 124 may be overlaid or otherwise used to replace content that was used to adapt the digital environment when it was rendered for display to the user.

Similar to digital environment service 104, it will be appreciated that, in other examples, a machine learning model and/or a weighted function with which a saliency metric is generated may be obtained from digital environment platform 102, such that at least some saliency metrics and associated content and/or location determinations may be generated at computing device 106.

Additionally, as noted above, any number of computing devices may be used in other examples. In such examples, the digital environment may be adapted for each respective user of the computing devices, such that the same digital environment has different associated representations that are presented to each user. For example, a first user may view the digital environment as including a first content item, while a second user may view the digital environment as including a second content item. Similarly, different environmental mechanics may be adapted for different users, as may be the case when the first user likes an environmental mechanic, while a second user does not like the environmental mechanic. As a further example, a first instance of external content may be presented to the first user based on a first set of interests associated with the first user, while a second instance of external content may be presented to the second user based on a second set of interests associated with the second user.

Figure 2:
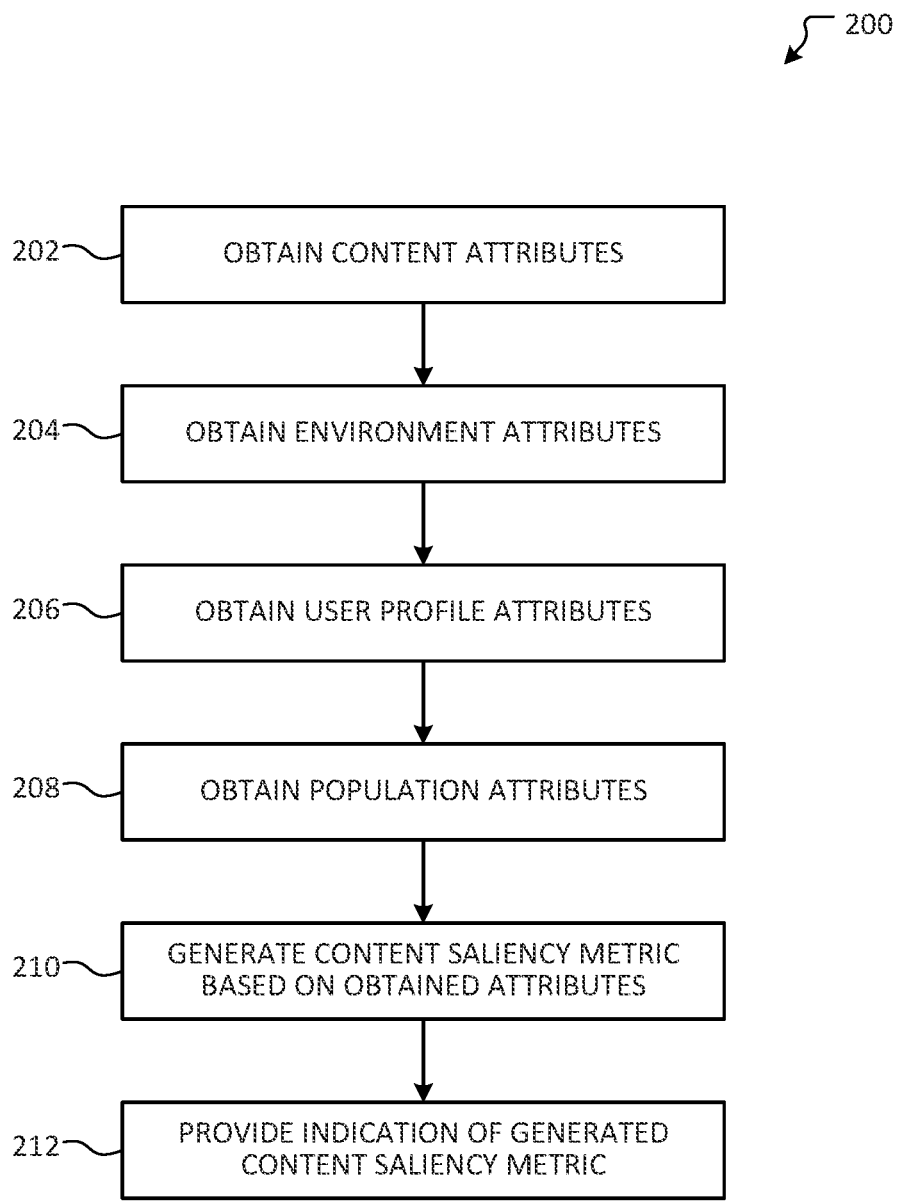
FIG. 2 illustrates an overview of an example method for generating a content saliency metric with which to adapt a digital environment according to aspects described herein.

FIG. 2 illustrates an overview of an example method 200 for generating a content saliency metric with which to adapt a digital environment according to aspects described herein. In examples, aspects of method 200 are performed by a saliency metric engine, such as saliency metric engine 112 discussed above with respect to FIG. 1.

As illustrated, method 200 begins at operation 202, where a set of content attributes are obtained. For example, the set of attributes may include a relative desirability and/or scarcity of the content (e.g., as may be determined based on a content data store, such as content data store 116, content data store 120, and/or content data store 126 discussed above with respect to FIG. 1). Such attributes may be relative, for example in relation to other content of the digital environment and/or content of one or more other digital environments. As another example, the set of attributes may include one or more attributes relating to the content itself, such as a gameplay mechanic type, an item type, a spatial location of the item within the digital environment, and/or an associated difficulty level, among other examples.

Flow progresses to operation 204, where a set of environment attributes are obtained. In examples, the set of environment attributes relate to a spatial location within the digital environment at which content may be presented, such as a spatial location proximate to a user (e.g., within a predetermined distance and/or within a user's viewshed). As another example, the set of environmental attributes may include an indication as to a user's progression within a storyline of the digital environment. Thus, it will be appreciated that the set of environment attributes may relate to the digital environment itself (e.g., a spatial location and/or one or more associated environmental assets, such as items and/or sounds) and a user's perception of and/or interaction with the digital environment.

Moving to operation 206, a set of user profile attributes is obtained. For example, the set of user profile attributes may relate to a user's play or interaction style, a number of user interactions with a given instance of content and/or with content of a similar type, a user's attention habits (e.g., based on a user's viewshed determined from an AR/VR headset), and/or explicit and/or implicit user-specific preferences, among other examples.

At operation 208, a set of population attributes are obtained. In examples, the set of population attributes includes attributes similar to those that were obtained at operation 206, but aggregated according to one or more population demographics. For example, the set of population attributes may be determined based on telemetry data associated with one or more digital environments (e.g., as may be stored by an interaction data store, such as interaction data store 114). As an example, a population attribute may indicate a difficulty level and/or a popularity associated with a game mechanic and/or spatial location at which a user is located and/or for which content may be determined.

While example attributes are described with respect to operations 202-208, it will be appreciated that any of a variety of additional and/or alternative attributes may be used in other examples. As an example, one or more of operations 202-208 may be omitted in other examples. Such attributes may be obtained based on telemetry data of an interaction data store (e.g., interaction data store 114), as part of a request for a saliency metric or content with which to adapt a digital environment, and/or based on a user profile (e.g., as may be stored by a computing device, a digital environment service, and/or a digital environment platform), among any of a variety of other data sources. In some instances, one or more attributes may be obtained based at least in part on other attributes. For example, a user profile attribute may be obtained based on an environment attribute (e.g., as may be the case when a user profile attribute is associated with a spatial location of the digital environment) or a population attribute may be obtained based on a user attribute.

Flow progresses to operation 210, where a content saliency metric is generated based on the attributes obtained at operations 202-208. As noted above, aspects of operation 210 may include generating the saliency metric using a machine learning model (e.g., as may have been trained based on user interactions with content of the digital environment and associated attributes). As another example, operation 210 may include generating the saliency metric based on a set of weightings associated with each attribute.

At operation 212, an indication of the generated saliency metric is provided. For example, the saliency metric may be provided in response to a request for a saliency metric (e.g., as may be received from a saliency processor, such as saliency processor 118 or 124 discussed above with respect to FIG. 1). As another example, the saliency metric may be provided and used to rank a set of content, examples of which are described below with respect to method 300 of FIG. 3.

While method 200 is provided as an example of generating a saliency metric for content, it will be appreciated that a saliency metric may similarly be generated for a spatial location based on location attributes (e.g., rarity and/or desirability of the location, proximity to other rare and/or desirable locations, as well as traffic, visibility, and/or or ease of access to the location), environment attributes, user profile attributes, and/or population attributes according to aspects described herein. Method 200 terminates at operation 212.

Figure 3:
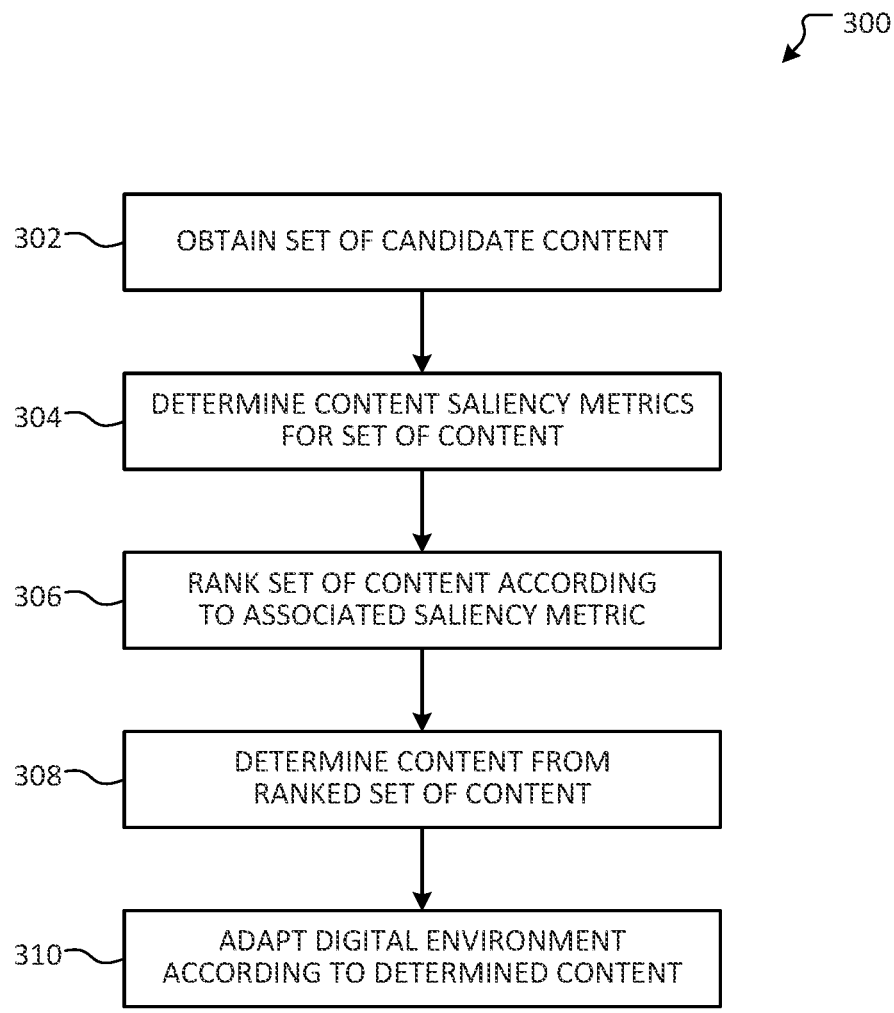
FIG. 3 illustrates an overview of an example method for adapting a digital environment according to aspects described herein.

FIG. 3 illustrates an overview of an example method 300 for adapting a digital environment according to aspects described herein. In examples, aspects of method 300 are performed by a saliency metric engine or a saliency processor, such as saliency metric engine 112 or saliency processors 118 or 124, respectively, discussed above with respect to FIG. 1. For example, aspects of method 300 may be performed by a digital environment service (e.g., digital environment service 104) to adapt a digital environment for presentation to a user of a computing device, or, in other examples, may similarly be performed by a computing device (e.g., computing device 106). As another example, similar aspects may be performed by a digital environment platform to identify content with which to adapt a digital environment.

As illustrated, method 300 begins at operation 302, where a set of candidate content is obtained. For example, at least a part of the set of content may be associated with the digital environment for which content is being determined. In another example, at least a part of the set of content may include external content (e.g., as may be associated with one or more other digital environments). The set of content may be obtained from any of a variety of sources, such as content data store 116, 120, and/or 126 of digital environment platform 102, digital environment service 104, and computing device 106, respectively, discussed above with respect to FIG. 1.

Flow progresses to operation 304, where saliency metrics are determined for the set of content. For example, operation 304 may comprise generating a saliency metric for each instance of content in the set of content that was obtained at operation 302. Aspects of operation 304 may be similar to those discussed above with respect to method 200 of FIG. 2.

At operation 306, the set of content is ranked based on the saliency metrics that were generated at operation 304. As noted above, a saliency metric may indicate a relative saliency in some examples or may indicate an absolute saliency in other examples. In some instances, operation 306 further comprises filtering out one or more instances of content (e.g., having a saliency metric below a predetermined threshold or to generate a ranked set of content having a predetermined number of items).

Moving to operation 308, content is determined from the ranked set of content. In examples, one or more highest ranked instances of content are selected or, as another example, content may be randomly selected from instances of content having saliency metrics above a predetermined threshold. Thus, it will be appreciated that any of a variety of techniques may be used to determine content from the ranked set of content.

Flow progresses to operation 310, where the digital environment is adapted according to the content that was determined at operation 308. For example, operation 310 may comprise adapting the digital environment to include a 2D or 3D asset or an NPC for presentation to the user. As another example, an environmental mechanic of the digital environment may be incorporated or modified, for example to present a user with a different set of RPG story options and/or to have a different level of difficulty, prominence, and/or length. While example adaptations are described, it will be appreciated that the digital environment may be adapted according to any of a variety of alternative or additional techniques. In some instances, operation 310 may comprise providing an indication of the determined content, as may be the case when the digital environment is rendered or a representation is otherwise created by a remote computing device (e.g., when aspects of method 300 are performed by a digital environment platform or a digital environment service). Method 300 terminates at operation 310.

Figure 4:
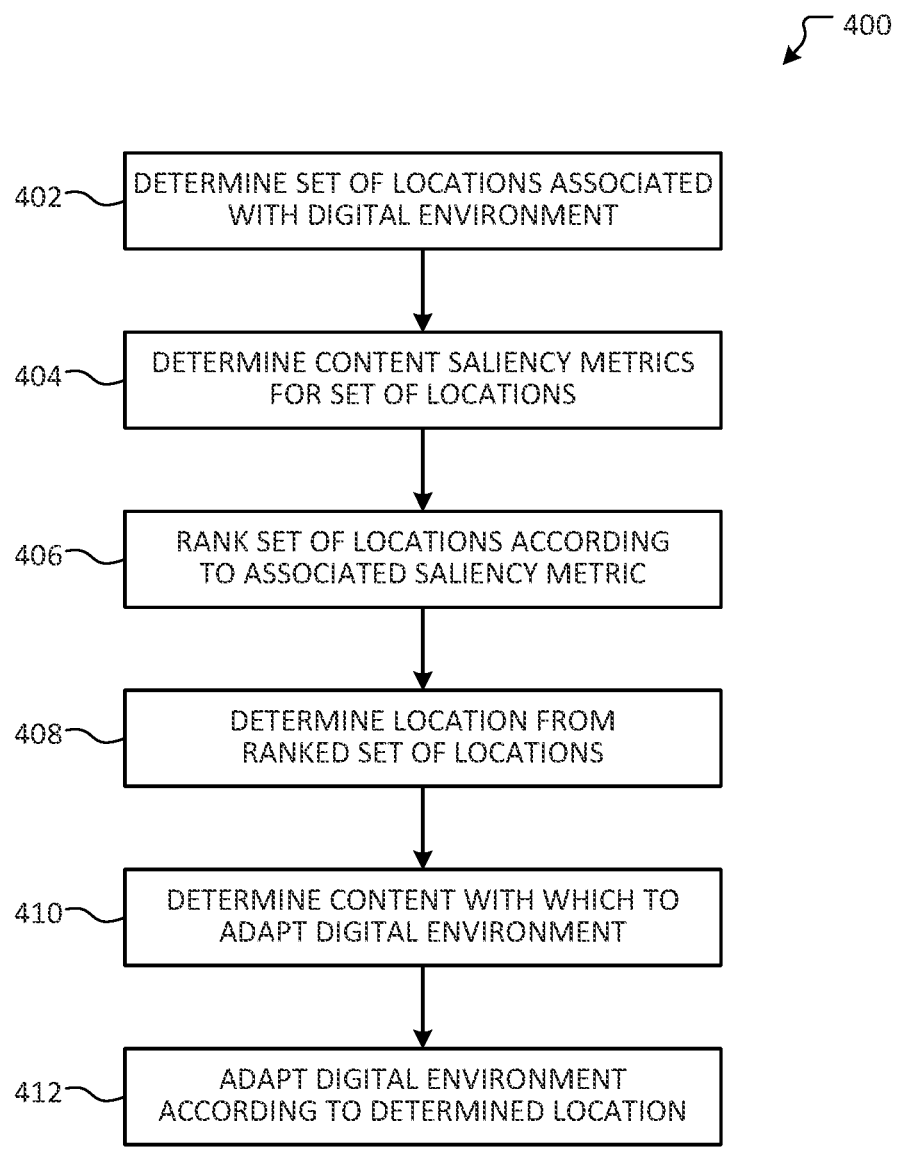
FIG. 4 illustrates an overview of another example method for adapting a digital environment according to aspects described herein.

FIG. 4 illustrates an overview of another example method 400 for adapting a digital environment according to aspects described herein. In examples, aspects of method 400 are performed by a saliency metric engine or a saliency processor, such as saliency metric engine 112 or saliency processors 118 or 124, respectively, discussed above with respect to FIG. 1. For example, aspects of method 400 may be performed by a digital environment service (e.g., digital environment service 104) to determine a location at which to present content within a digital environment. As another example, such aspects may similarly be performed by a computing device (e.g., computing device 106) or by a digital environment platform (e.g., digital environment platform 102).

Method 400 begins at operation 402, where a set of locations are determined. In examples, the set of locations may be determined based on a location of a user within the digital environment. For example, the set of locations may include surfaces that are proximate to a user (e.g., within a predetermined radius or region or within the viewshed of a user). It will be appreciated that a spatial location may have a corresponding location in a physical environment of the user, as may be the case when the digital environment is overlaid on the physical environment via an AR headset.

Flow progresses to operation 404, where saliency metrics are determined for the set of locations. For example, operation 404 may comprise generating a saliency metric for each location in the set of locations that was determined at operation 402. Aspects of operation 404 may be similar to those discussed above with respect to method 200 of FIG. 2, such that the saliency metric is generated based on one or more location attributes, environment attributes, user profile attributes, and/or population attributes according to aspects described herein.

At operation 406, the set of locations is ranked based on the saliency metrics that were generated at operation 404. As noted above, a saliency metric may indicate a relative saliency in some examples or may indicate an absolute saliency in other examples. In some instances, operation 406 further comprises filtering out one or more locations (e.g., having a saliency metric below a predetermined threshold or to generate a ranked set of locations having a predetermined number of items).

Moving to operation 408, a location is determined from the ranked set of locations. In examples, one or more highest ranked locations are selected or, as another example, a location may be randomly selected from locations having saliency metrics above a predetermined threshold. Thus, it will be appreciated that any of a variety of techniques may be used to determine a location from the ranked set of locations.

Flow progresses to operation 410, where content is determined with which to adapt the digital environment (e.g., at the location that was determined at operation 408). For example, aspects of operation 410 may be similar to those discussed above with respect to operations 302-308 of method 300 in FIG. 3 and are therefore not necessarily redescribed in detail below. In examples, the set of content from which the content is determined is generated based at least in part on the location that was determined at operation 408. Thus, a different set of content may be generated for different locations within the digital environment.

At operation 412, the digital environment is adapted according to the location that was determined at operation 408 using the content that was determined at operation 410. For example, operation 412 may comprise adapting the digital environment to include a 2D or 3D asset or an NPC for presentation to the user at the determined location. As another example, an environmental mechanic may be incorporated or modified in association with the determined location. In some instances, the content determined at operation 410 is overlaid within a physical environment of the user (e.g., as may be the case when the user is wearing an AR headset).

While example adaptations are described, it will be appreciated that the digital environment may be adapted according to any of a variety of alternative or additional techniques. In some instances, operation 412 may comprise providing an indication of the determined location and associated content, as may be the case when the digital environment is rendered or a representation is otherwise created by a remote computing device (e.g., when aspects of method 400 are performed by a digital environment platform or a digital environment service). Further, while method 400 is described as an example where content is subsequently determined based on a location having a high saliency metric, it will be appreciated that, in other examples, a location may subsequently be determined based on content having a high saliency metric. Method 400 terminates at operation 412.

Figure 5:
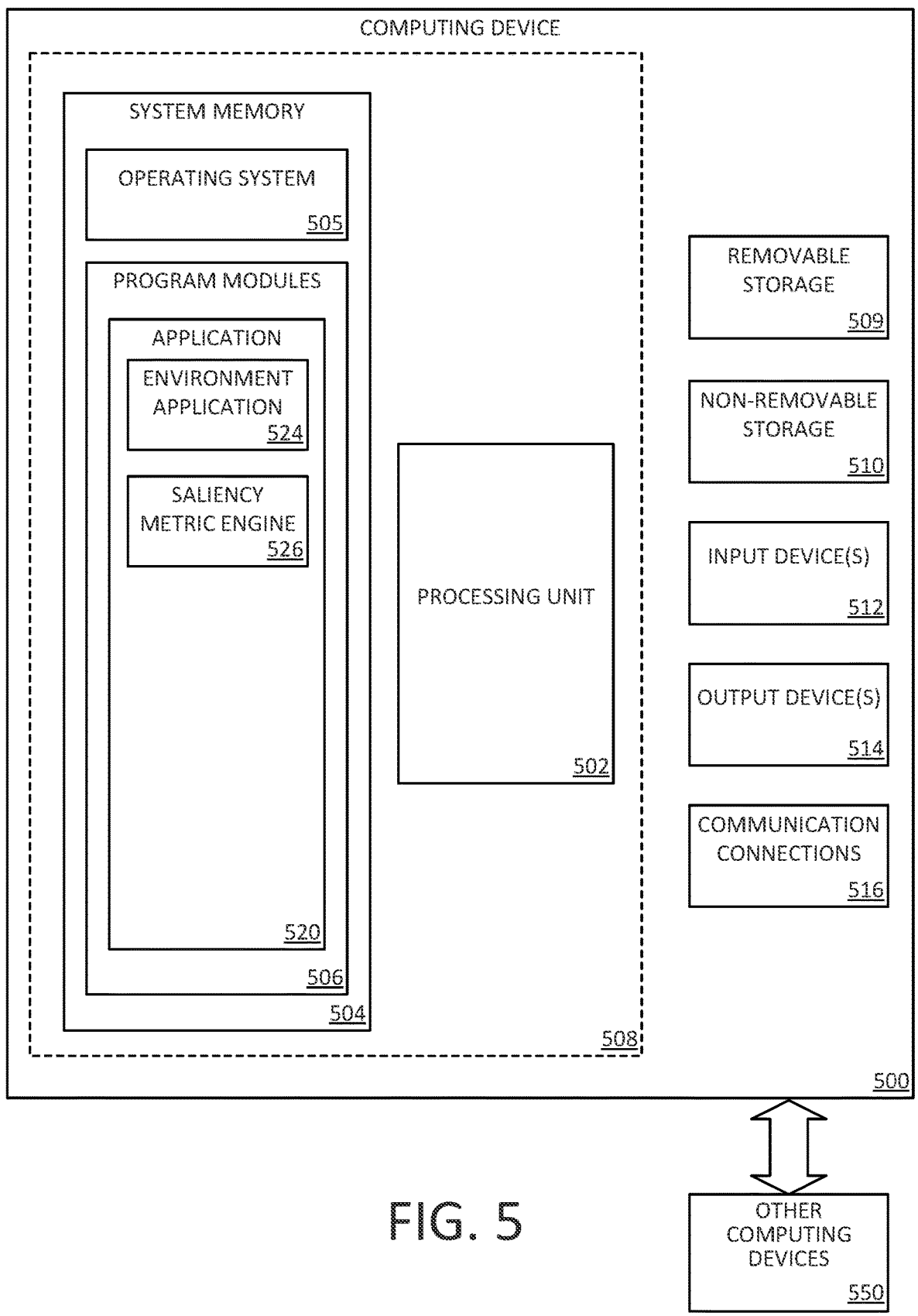
FIG. 5 is a block diagram illustrating example physical components of a computing device with which aspects of the disclosure may be practiced.
Figure 6A:
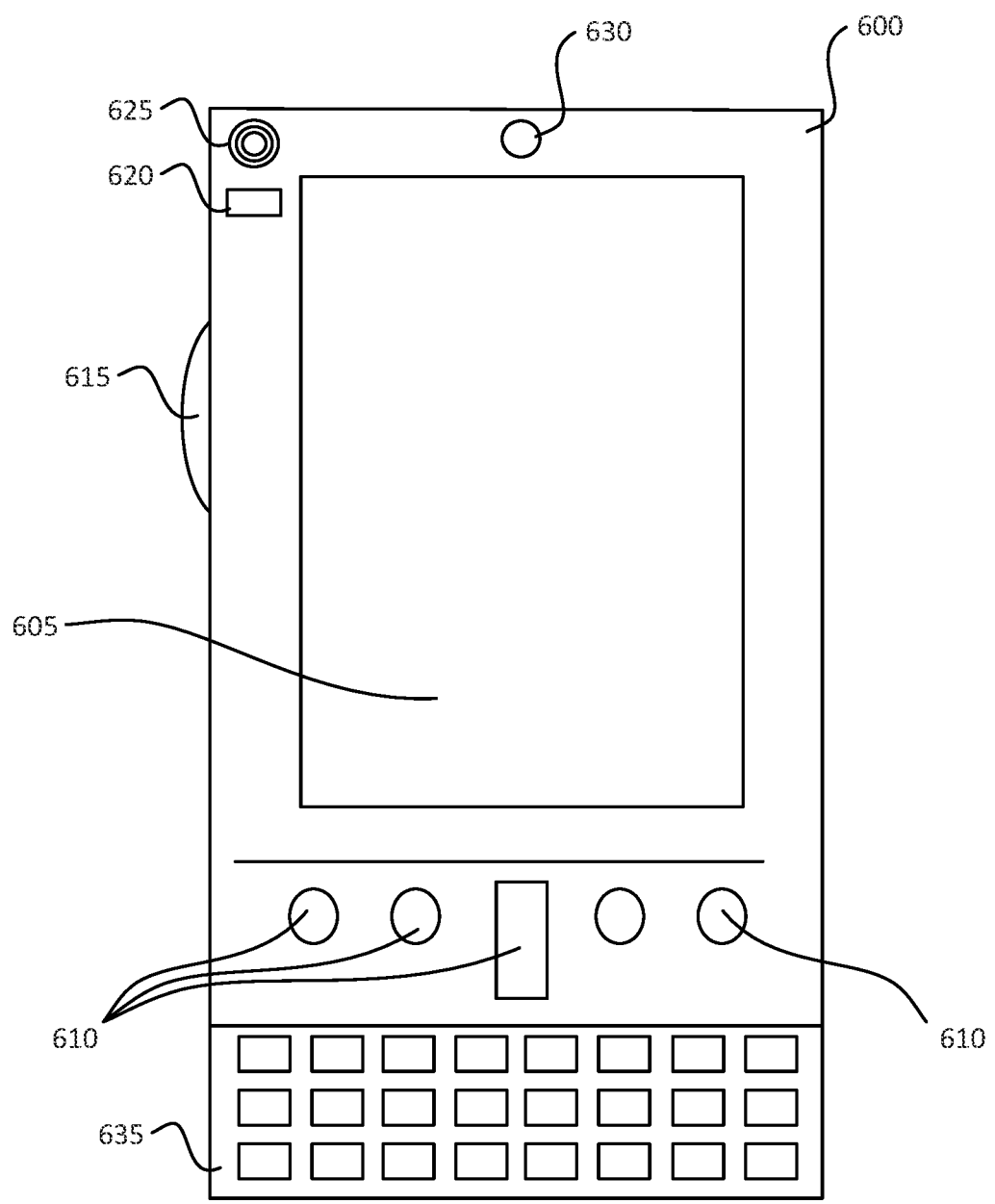
FIGS. 6A and 6B are simplified block diagrams of a mobile computing device with which aspects of the present disclosure may be practiced.
Figure 6B:
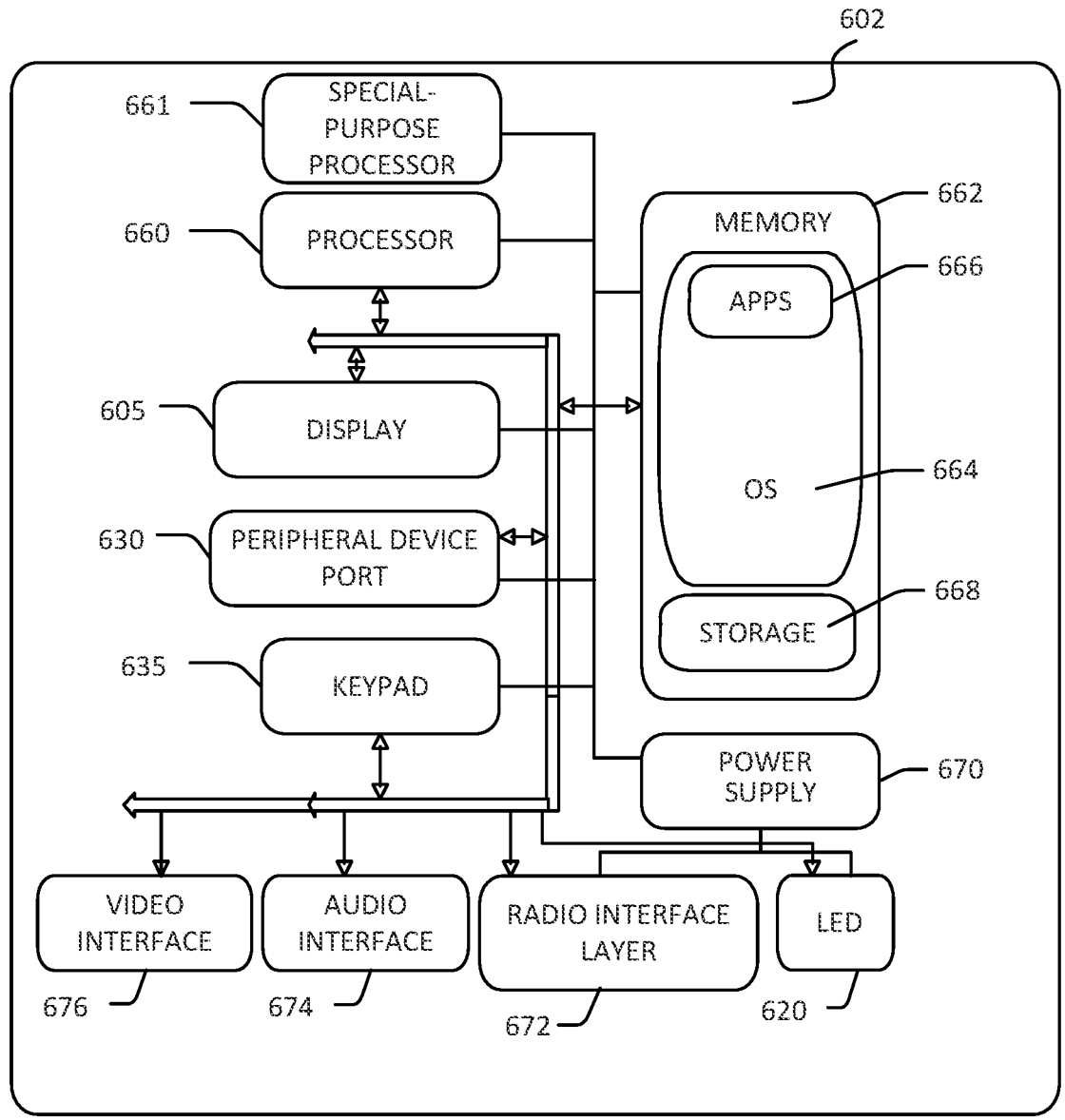
Figure 7:
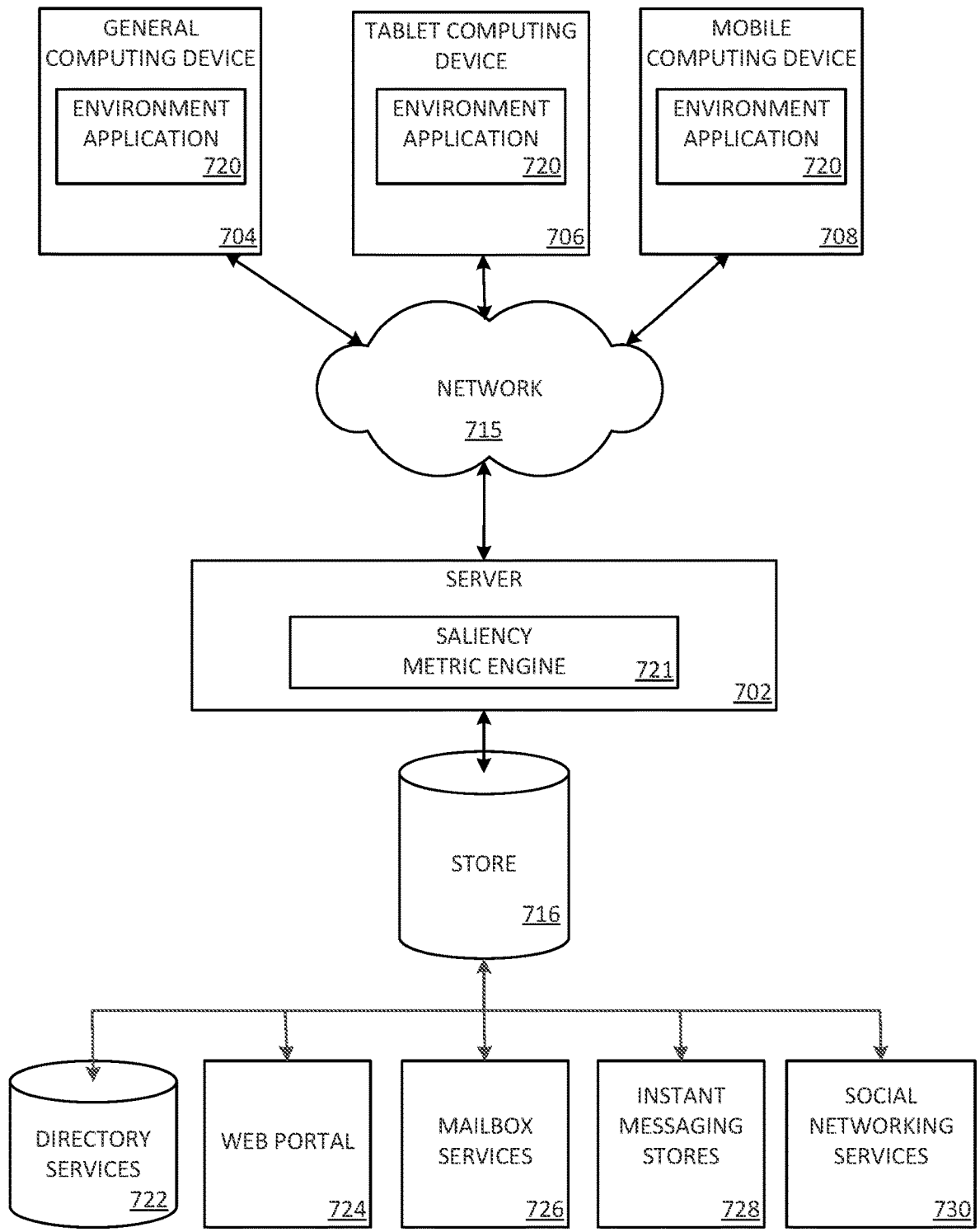
FIG. 7 is a simplified block diagram of a distributed computing system in which aspects of the present disclosure may be practiced.

FIGS. 5-7 and the associated descriptions provide a discussion of a variety of operating environments in which aspects of the disclosure may be practiced. However, the devices and systems illustrated and discussed with respect to FIGS. 5-7 are for purposes of example and illustration and are not limiting of a vast number of computing device configurations that may be utilized for practicing aspects of the disclosure, described herein.

FIG. 5 is a block diagram illustrating physical components (e.g., hardware) of a computing device 500 with which aspects of the disclosure may be practiced. The computing device components described below may be suitable for the computing devices described above, including digital environment platform 102, digital environment service 104, and/or computing device 106 discussed above with respect to FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store environment application 524 and saliency metric engine 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein.

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

An environment application 720 may be employed by a client that communicates with server device 702, and/or saliency metric engine 721 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

In addition, it will be appreciated that the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: obtaining a set of factors associated with a digital environment, wherein the digital environment is an augmented reality digital environment; determining, based on the set of factors, content from a set of candidate content based on a saliency metric associated with each instance of content in the set of candidate content; and adapting the digital environment according to the determined content, wherein adapting the digital environment comprises at least one of: including the determined content in the digital environment for presentation to a user; or modifying an environmental mechanic of the digital environment based on the determined content. In an example, the set of candidate content includes content associated with another digital environment or content that is not associated with a digital environment. In another example, the saliency metric defines a relative saliency of the determined content associated with the user as compared to another instance of content of the set of candidate content. In a further example, the set of operations comprises determining a location from a set of candidate locations of the digital environment based on a saliency metric for each candidate location of the set of candidate locations; and including the determined content comprises including the determined content at the determined location within the digital environment. In yet another example, a saliency metric associated with an instance of candidate content is generated using a machine learning model, wherein the machine learning model is trained using training data that comprises a user interaction with content of the digital environment, and wherein the user interaction is annotated with one or more associated factors. In a further still example, the set factors comprises: a content attribute associated with the determined content; an environment attribute associated with the digital environment; a user profile attribute associated with the user; and a population attribute associated with a population of the digital environment. In another example, the set of factors is obtained based on telemetry data associated with the digital environment.

In another aspect, the technology relates to a method for adapting a digital environment based on a saliency metric. The method comprises: generating a representation of the digital environment for presentation to a user; requesting, from a digital environment platform, content to adapt the digital environment for the user; receiving an indication of content from the digital environment platform; and adapting the digital environment according to the received indication of content, wherein adapting the digital environment comprises at least one of: including the content in the representation of the digital environment; or modifying an environmental mechanic of the digital environment based on the content. In an example, requesting the content to adapt the digital environment for the user comprises providing an indication of a user profile associated with the user to the digital environment platform. In another example, the received content is associated with another digital environment. In a further example, the received indication of content is a first instance of content and the method further comprises generating a stream of the representation of the digital environment, wherein generating the stream comprises: determining a second instance of content to adapt the stream; and adapting the stream to include the second instance of content. In yet another example, the stream is adapted to include the second instance of content in place of the first instance of content. In a further still example, the first instance of content is determined based at least in part on the user; and the second instance of content is determined based at least in part on a population associated with the digital environment.

In a further aspect, the technology relates to another method for adapting a digital environment based on a saliency metric. The method comprises: obtaining a set of factors associated with a digital environment, wherein the digital environment is an augmented reality digital environment; determining, based on the set of factors, content from a set of candidate content based on a saliency metric associated with each instance of content in the set of candidate content; and adapting the digital environment according to the determined content, wherein adapting the digital environment comprises at least one of: including the determined content in the digital environment for presentation to a user; or modifying an environmental mechanic of the digital environment based on the determined content. In an example, the set of candidate content includes content associated with another digital environment or content that is not associated with a digital environment. In another example, the saliency metric defines a relative saliency of the determined content associated with the user as compared to another instance of content of the set of candidate content. In a further example, the method comprises determining a location from a set of candidate locations of the digital environment based on a saliency metric for each candidate location of the set of candidate locations; and including the determined content comprises including the determined content at the determined location within the digital environment. In yet another example, a saliency metric associated with an instance of candidate content is generated using a machine learning model, wherein the machine learning model is trained using training data that comprises a user interaction with content of the digital environment, and wherein the user interaction is annotated with one or more associated factors. In a further still example, the set factors comprises: a content attribute associated with the determined content; an environment attribute associated with the digital environment; a user profile attribute associated with the user; and a population attribute associated with a population of the digital environment. In another example, the set of factors is obtained based on telemetry data associated with the digital environment.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:
1. A system comprising:
at least one processor; and
memory storing instructions that, when executed by the at least one processor, causes the system to perform a set of operations, the set of operations comprising:
obtaining a set of factors associated with a digital environment, wherein the digital environment is an augmented reality digital environment;
determining, based on the set of factors, content from a set of candidate content based on a saliency metric associated with each instance of content in the set of candidate content;
determining a location from a set of candidate locations of the digital environment based on a saliency metric for each candidate location of the set of candidate locations; and
adapting the digital environment at the determined location according to the determined content, wherein adapting the digital environment comprises at least one of:
including the determined content in the digital environment for presentation to a user; or
modifying an environmental mechanic of the digital environment based on the determined content.

2. The system of claim 1, wherein the set of candidate content includes content associated with another digital environment or content that is not associated with a digital environment.

3. The system of claim 1, wherein the saliency metric defines a relative saliency of the determined content associated with the user as compared to another instance of content of the set of candidate content.

4. The system of claim 1, wherein a saliency metric associated with an instance of candidate content is generated using a machine learning model, wherein the machine learning model is trained using training data that comprises a user interaction with content of the digital environment, and wherein the user interaction is annotated with one or more associated factors.

5. The system of claim 1, wherein the set factors comprises:
a content attribute associated with the determined content;
an environment attribute associated with the digital environment;
a user profile attribute associated with the user; and
a population attribute associated with a population of the digital environment.

6. The system of claim 1, wherein the set of factors is obtained based on telemetry data associated with the digital environment.

7. A method for adapting a digital environment based on a saliency metric, the method comprising:
- generating a representation of the digital environment for presentation to a user;
- requesting, from a digital environment platform, content to adapt the digital environment for the user;
- receiving an indication of content from the digital environment platform;
- determining a location from a set of candidate locations of the digital environment based on a saliency metric for each candidate location of the set of candidate locations; and
- adapting the digital environment at the determined location according to the received indication of content, wherein adapting the digital environment comprises at least one of:
  - including the content in the representation of the digital environment; or
  - modifying an environmental mechanic of the digital environment based on the content.

8. The method of claim 7, wherein requesting the content to adapt the digital environment for the user comprises providing an indication of a user profile associated with the user to the digital environment platform.

9. The method of claim 7, wherein the received content is associated with another digital environment.

10. The method of claim 7, wherein the received indication of content is a first instance of content and the method further comprises generating a stream of the representation of the digital environment, wherein generating the stream comprises:
- determining a second instance of content to adapt the stream; and
- adapting the stream to include the second instance of content.

11. The method of claim 10, wherein the stream is adapted to include the second instance of content in place of the first instance of content.

12. The method of claim 10, wherein:
- the first instance of content is determined based at least in part on the user; and
- the second instance of content is determined based at least in part on a population associated with the digital environment.

13. A method for adapting a digital environment based on a saliency metric, the method comprising:
- obtaining a set of factors associated with a digital environment, wherein the digital environment is an augmented reality digital environment;
- determining, based on the set of factors, content from a set of candidate content based on a saliency metric associated with each instance of content in the set of candidate content;
- determining a location from a set of candidate locations of the digital environment based on a saliency metric for each candidate location of the set of candidate locations; and
- adapting the digital environment at the determined location according to the determined content, wherein adapting the digital environment comprises at least one of:
  - including the determined content in the digital environment for presentation to a user; or
  - modifying an environmental mechanic of the digital environment based on the determined content.

14. The method of claim 13, wherein the set of candidate content includes content associated with another digital environment or content that is not associated with a digital environment.

15. The method of claim 13, wherein the saliency metric defines a relative saliency of the determined content associated with the user as compared to another instance of content of the set of candidate content.

16. The method of claim 13, wherein a saliency metric associated with an instance of candidate content is generated using a machine learning model, wherein the machine learning model is trained using training data that comprises a user interaction with content of the digital environment, and wherein the user interaction is annotated with one or more associated factors.

17. The method of claim 13, wherein the set factors comprises:
- a content attribute associated with the determined content;
- an environment attribute associated with the digital environment;
- a user profile attribute associated with the user; and
- a population attribute associated with a population of the digital environment.

18. The method of claim 13, wherein the set of factors is obtained based on telemetry data associated with the digital environment.

19. The system of claim 1, wherein the saliency metric for each candidate location is determined based on the user.

20. The method of claim 13, wherein the saliency metric for each candidate location is determined based on the user.

* * * * *